June 30, 1931.    E. C. THOMPSON    1,812,181
SHUTTER LOCKING DEVICE FOR CAMERAS
Filed Feb. 23, 1923
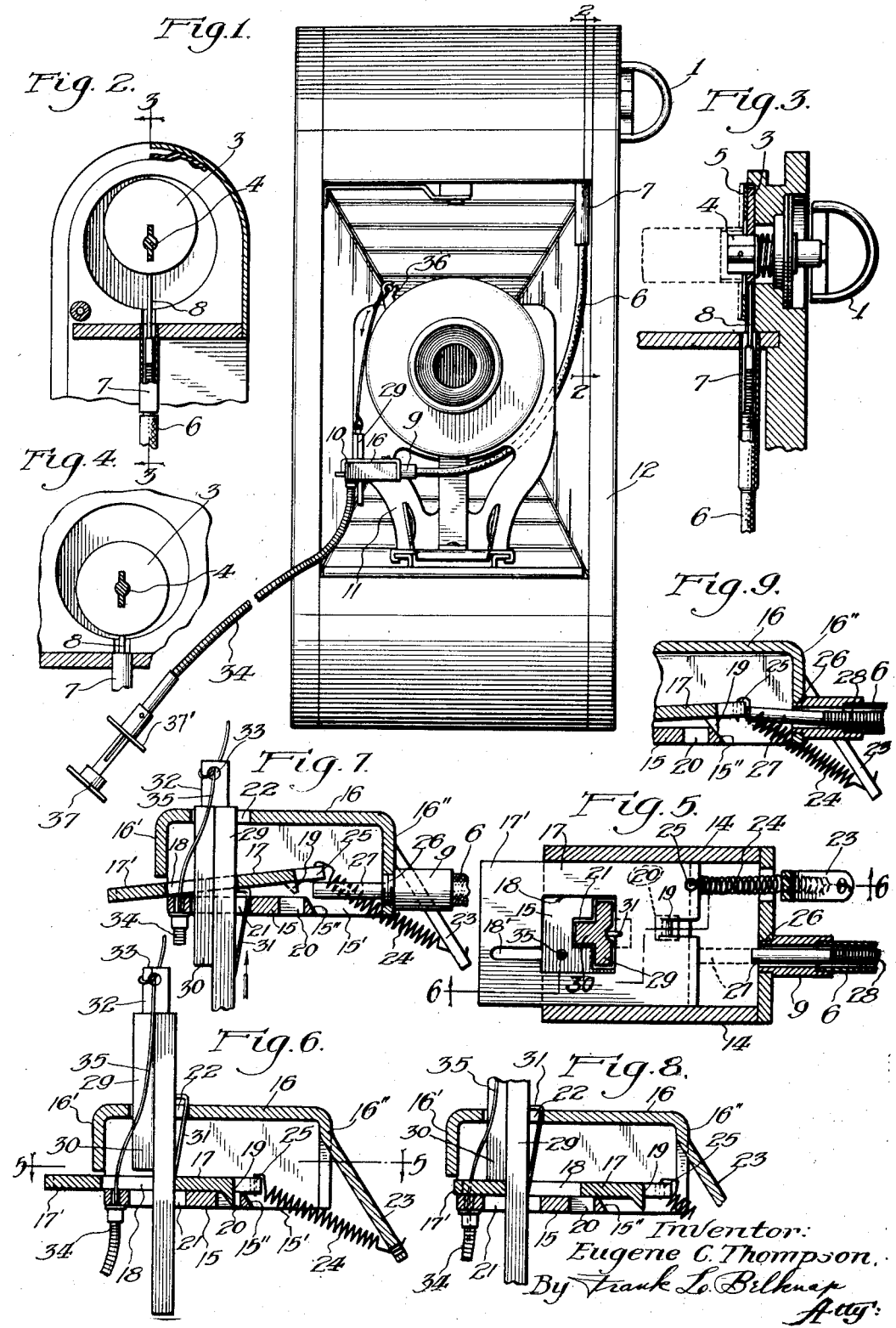

Patented June 30, 1931

1,812,181

UNITED STATES PATENT OFFICE

EUGENE C. THOMPSON, OF LOS ANGELES, CALIFORNIA

SHUTTER LOCKING DEVICE FOR CAMERAS

Application filed February 23, 1928. Serial No. 256,111.

The object of my invention is to provide a device for the prevention of double exposure in roll film cameras of the conventional and well known type, which device may be attached to any ordinary camera adapted to receive roll films without the modification of any mechanism of the camera or shutter.

It may be pointed out that in folding roll film cameras available space for the attachment of any additional mechanism is extremely scarce, and those skilled in the art have found it difficult to apply any attachment whatever to folding roll-film cameras in such manner that the attached device would in no way interfere with the folding or picture taking functions of the camera. In rolling up the film on the winding spool the diameter of the roll constantly increases, resulting in a varying number of turns of the winding key being required to bring up a new section of film to exposure position. Accordingly, allowance must be made for this. The present invention has for one of its novel features means for insuring the shutter actuating mechanism being locked at the proper time, regardless of whether the winding key be turned two and a half or three and a half revolutions, and the like. In the present invention I provide novel mechanism by which the turning of the winding key for rolling up the film controls the actuation of the shutter, in the sense that it locks or unlocks the shutter actuating mechanism.

In the drawings, Fig. 1 is a front elevation of the essential parts of a roll film camera, showing my invention applied thereto.

Fig. 2 is a fragmentary view, partly in side elevation, partly in vertical section, of the cam mechanism, taken on line 2—2 of Fig. 1.

Fig. 3 is a transverse vertical sectional view of the winding spool mechanism and associated parts of applicant's device relative thereto, taken on lines 3—3 of Fig. 2.

Fig. 4 is a fragmentary view showing another position of the cam member.

Fig. 5 is a horizontal sectional view of the film locking device taken on lines 5—5 of Fig. 6.

Fig. 6 is a vertical sectional view taken on the indirect line 6—6 of Fig. 5.

Fig. 7 is a view similar to Fig. 6, but showing the locking mechanism in another position.

Fig. 8 is a view similar to Fig. 7, showing still another locking position.

Fig. 9 is a view similar to Fig. 8, showing another position of the locking device.

Referring to the drawings, a cam 3 fits loosely over the flanged end of the winding key 4, shown in section in Fig. 3, but being well known to those skilled in the art, and not claimed as a part of my invention, is not described herein. This cam is held in place by a thin metal plate 5 (Fig. 3), perforated for the passage of the flange of the winding key 4. An ordinary cable release 6 (Bowden wire) has its finger knobs removed, and its tube-like end 7 screwed into the wall of the film chamber adjacent the side wall of the camera. This cable release 6 being well known to those conversant with the art will not be specifically described. The tube-end 7, of the cable release carries the short shaft 8, attached to the cable of the release, which is held against the cam 3 in its travel by the spring with which these releases are normally equipped. The other end 9 of this release is screwed into the cover plate 16.

A U-shaped plate 10 is attached to the shutter holding plate 11 of the camera 12 by screws, not shown. The side walls of this plate are shown at 14, Fig. 5, and the bed-plate 15 of the plate 10 is partly cut away, as shown at 15′. This bed plate 15 has a cover 16, with its ends bent down, as shown at 16′ and 16″. Sliding on the bed plate 15 is a plate 17, called the locking plate, with a rectangular opening 18 (Fig. 5) and a narrow extension thereof 18′. This locking plate 17 has a nib 19 turned down, adapted to drop into the aperture 20 in bed plate 15. The bed plate 15 and its cover 16 are each respectively perforated with cross-shaped openings 21 and 22, the shape of which will be more clearly apparent in Fig. 5. The cover plate 16 has an angularly projecting lip 23 for the attachment of the spring 24, the other end of the spring being attached to the plate 17 at 25. This cover plate 16 also has a threaded perforation 26 into which is screwed the end 9 of the cable release 6, through which passes the plunger-like end 27 of the flexible cable 28. The latch plate 29 passes through the openings 21 and 22 in the bed plate 15 and cover plate 16. One side of this latch plate 29 has a spline 30 (shown in section in Fig. 5) for about half its length. The opposite side of the latch plate 29 has a resilient latch 31. The end of plate 29 has a projection 32 with an aperture 33. Into plate 15 is screwed the knurled end of release 34, also of a conventional type, in which when operated the wire 35 moves toward the operator instead of away, as in the type of release 6 previously referred to. The wire 35 is looped through aperture 33 in end 32 of plate 29, and continues on to the shutter operating lever 36, Fig. 1.

In the operation of the device, Fig. 6 shows the locking plate 17 positioned to allow the operation of the shutter. The finger-piece 37' is pulled toward thumb knob 37 of the release 34, which retracts the wire 35, pulling the latch plate 29 down until the latch 31 snaps under the plate 17, the spline 30 passing freely through the rectangular opening in the plate 17, the extent of this movement being just sufficient to operate the shutter lever 36, this lever tending to return to its normal position by a spring in the shutter, not a novel feature of this invention. The upward pull of this lever 36 raises the latch plate 29 (as shown in Fig. 7) whereby the locking plate 17 is shown with its lip 19 being lifted out of the aperture 20 in the bed plate 15, the end 17' being prevented from rising by the cover plate end 16'. The spring 24 will now pull the locking plate 17 forward and downward to the position shown in Fig. 8, the latch plate 29 returning to the position shown in Fig. 6. If now the cable release 34 is again actuated, the latch plate 29 will be depressed slightly until its spline 30 comes in contact with the end 17' of the plate 17, in the manner shown in Fig. 8, thus locking the shutter actuating mechanism.

In order to unlock this mechanism and allow another actuation of the shutter, the winding key 1 must be turned at least one full revolution, more than one revolution always being required to bring up a new length of film to exposure position. As the winding key is turned the cam 3 depresses the end 8 of the cable release 6, causing the plunger-like end 27 to engage the end of the locking plate 15, as shown in Fig. 9, this plunger-like end of the cable release being rather loose in its guide 9 and being a continuation of the spring cable 28 of the release 6 follows the end of the locking plate 17, as it rises slightly to allow the lip 19 to pass over the edge 15" of the bed plate 15 and drop into the aperture 20 thereof. In this position the shutter actuating mechanism is again unlocked and ready for another exposure. As previously pointed out, as the film is wound onto the receiving spool, a constantly diminishing number of turns of the winding key is required to bring up a new section of film, so that the plunger 27 may finally stop at any point in its path of travel. If it should stop in the position shown in Fig. 5 the locking plate 17 would freely return to the position shown in Fig. 8. If the plunger stops in the position shown in Fig. 7 the end of locking plate 17 on being lifted, as shown in Fig. 7, passes over the end of the plunger, returning to approximately the position shown in Fig. 8, but when the plunger 27 returns to the position shown in Fig. 5, as it must in the course of one revolution of the cam 3, the end of locking plate 17 will drop down and again engage the end of the plunger 27. This device is very small, and the range of movement of the parts very limited, the drawings being considerably enlarged, but by no means enlarged to scale. The longitudinal travel of the locking plate 17 is actually about $\tfrac{1}{16}$ inch, so that even should the plunger 27 stop at some intermediate point, it is found in actual use of the device, that the end of locking plate 15 does not drop down and prematurely engage the end of the plunger 27, as might appear possible from an examination of the much enlarged drawings.

I claim as my invention:

1. In a camera adapted to receive roll films, the combination with a film spool-winding key and shutter actuating mechanism, of means for placing said shutter actuating mechanism in operative or inoperative position, comprising a vertically movable locking member, a spline upon the locking member, means for moving the locking member downwardly and actuating the shutter, means for moving the locking member upwardly, and a horizontally slidable element adapted to engage the spline when the said locking member is in upward position and additional means for releasing the said engagement.

2. In a camera adapted to receive roll films, the combination with a film spool-winding key and shutter actuating mechanism, of means for placing said shutter actuating mechanism in operative or inoperative position, comprising a vertically movable locking member, a spline upon the locking member, means for moving the locking member downwardly and actuating the shutter, means for moving the locking member upwardly, and a horizontally slidable element adapted to engage the spline when the said locking member is in upward position and additional means for releasing the said engagement, said additional means including a plunger adapted to actuate the slidable element, and a cam operatively associated with the film roll for actuating the plunger.

3. In a camera adapted to receive roll films, the combination with a film spool-winding key and shutter actuating mechanism, of means for placing said shutter actuating mechanism in operative or inoperative position, comprising a horizontally slidable plate having an opening therein, a vertically movable locking member normally positioned in said opening, operative connection between the locking member and the camera shutter, and means for locking the vertically moving member with said horizontally slidable plate in a predetermined position upon actuation of the camera shutter.

4. In a camera adapted to receive roll films, the combination with a film spool-winding key and shutter actuating mechanism, of means for placing said shutter actuating mechanism in operative or inoperative position, comprising a horizontally slidable plate having an opening therein, a vertically movable locking member normally positioned in said opening, operative connection between the locking member and the camera shutter, means for locking the vertically moving member with said horizontally slidable plate in a predetermined position upon actuation of the camera shutter, and additional means for releasing the said locking member.

5. In a camera adapted to receive roll films, the combination with a film spool-winding key and shutter actuating mechanism, of means for placing said shutter actuating mechanism in operative or inoperative position, comprising a horizontally slidable plate having an opening therein, a vertically movable locking member positioned in said opening, operative connection between the locking member and the camera shutter, means for locking the vertically moving member with said horizontally slidable plate in a predetermined position, upon actuation of the camera shutter, and additional means for releasing the said locking member, said additional means including a plunger adapted to actuate the slidable plate and a cam operatively associated with the film roll for actuating the plunger.

In testimony whereof I affix my signature.

EUGENE C. THOMPSON.